(12) United States Patent
Numata

(10) Patent No.: US 10,682,753 B2
(45) Date of Patent: Jun. 16, 2020

(54) ELECTRIC POWER TOOL

(71) Applicant: MAKITA CORPORATION, Anjo-shi, Aichi (JP)

(72) Inventor: Fumitoshi Numata, Anjo (JP)

(73) Assignee: MAKITA CORPORATION, Anjo (JP)

( * ) Notice: Subject to any disclaimer, the term of this patent is extended or adjusted under 35 U.S.C. 154(b) by 98 days.

(21) Appl. No.: 16/081,614

(22) PCT Filed: Mar. 15, 2017

(86) PCT No.: PCT/JP2017/010323
§ 371 (c)(1),
(2) Date: Aug. 31, 2018

(87) PCT Pub. No.: WO2017/159711
PCT Pub. Date: Sep. 21, 2017

(65) Prior Publication Data
US 2019/0176316 A1 Jun. 13, 2019

(30) Foreign Application Priority Data
Mar. 17, 2006 (JP) .................................. 2016-053565

(51) Int. Cl.
*H02K 11/28* (2016.01)
*B25F 5/02* (2006.01)
(Continued)

(52) U.S. Cl.
CPC ................ *B25F 5/02* (2013.01); *A41D 13/00* (2013.01); *A41D 19/015* (2013.01); *A41D 20/00* (2013.01);
(Continued)

(58) Field of Classification Search
CPC .... H02K 11/28; H02K 7/145; H02K 11/0094; B25F 5/02; A41D 13/00; A41D 19/015; A41D 20/00
(Continued)

(56) References Cited

U.S. PATENT DOCUMENTS 7,784,104 B2   8/2010 Innami et al.
2004/0108120 A1   6/2004 Wiesner et al.
(Continued)

FOREIGN PATENT DOCUMENTS

DE   100 29 138 A1   1/2002
EP   1 440 771 A1   7/2004
(Continued)

OTHER PUBLICATIONS

May 9, 2017 International Search Report issued in International Patent Application No. PCT/JP2017/010323.
(Continued)

*Primary Examiner* — Terrance L Kenerly
(74) *Attorney, Agent, or Firm* — Oliff PLC

(57) ABSTRACT

An electric power tool from starting unintentionally by the user, stopping a locked-on state in an unintentional situation by the user, as well as enhances the theft suppressing effect of the electric power tool. The present invention relates to a starting system including an electric power tool and a glove as a wearable device a user puts on. Only when a use permission signal is received from the glove the user puts on, the operational state of the electric power tool changes to a start standby state whereby electrical functions of the tool can then be utilized, and only in the start standby state, the electric power tool is configured to start by an on-operation thereof.

16 Claims, 6 Drawing Sheets

(51) Int. Cl.
  *A41D 13/00* (2006.01)
  *B25F 5/00* (2006.01)
  *B24B 23/02* (2006.01)
  *A41D 19/015* (2006.01)
  *A41D 20/00* (2006.01)
  *H02K 7/14* (2006.01)
  *H02K 11/00* (2016.01)
  *A41D 19/00* (2006.01)

(52) U.S. Cl.
  CPC ............ *B24B 23/02* (2013.01); *B24B 23/028* (2013.01); *B25F 5/00* (2013.01); *H02K 7/145* (2013.01); *H02K 11/0094* (2013.01); *H02K 11/28* (2016.01); *A41D 19/0024* (2013.01)

(58) Field of Classification Search
  USPC .......................................................... 310/50
  See application file for complete search history.

(56) References Cited

U.S. PATENT DOCUMENTS

| | | |
|---|---|---|
| 2006/0208577 A1 | 9/2006 | Richter et al. |
| 2012/0048588 A1 | 3/2012 | Iyoda et al. |
| 2015/0162646 A1 | 6/2015 | Kawase et al. |
| 2016/0306434 A1* | 10/2016 | Ferrin ..................... G06F 3/017 |

FOREIGN PATENT DOCUMENTS

| | | |
|---|---|---|
| JP | 4678199 B2 | 4/2011 |
| JP | 2012-54007 A | 3/2012 |
| JP | 2012-61541 A | 3/2012 |
| JP | 2013-188803 A | 9/2013 |
| JP | 2013-255965 A | 12/2013 |

OTHER PUBLICATIONS

May 9, 2017 Written Opinion issued in International Patent Application No. PCT/JP2017/010323.

* cited by examiner

ELECTRIC POWER TOOL

TECHNICAL FIELD

The present invention relates to an electric power tool such as a disc grinder etc.

BACKGROUND ART

A lever-type start switch for a user to pull is provided as part of an electric power tool such as a disc grinder etc. When the start switch is pulled (triggering an on operation, wherein hereafter on-operation refers to making a component such as the power tool operational in the ON state), an electric motor will start and the electric power tool can be used. When the start switch is released, on-operation ceases, and the electric motor will stop. The start switch is provided on a grip for a user to hold such that the switch is capable of alternating between an on-position and an off-position by tilting movement or parallel movement.

The switch has a main body which is turned on/off by an operation of the start switch. Power supply or interruption thereof to the electric motor is governed by an electric on/off signal from the switch main body. With regard to the start switch, a known problem is that malfunction may sometimes occur because, for example, an inside gap of the switch may be clogged with dust. Especially when grinding work is performed by use of a tool such as a disc grinder, peripheral portions around a support member of the start switch may also become clogged with a substantial amount of dust that is generated by the grinding work, which can consequently cause device malfunction. The malfunction of the start switch can hinder and impede a smooth start/stop operation of the device.

In order to solve the above-mentioned problems of the start switch, a technique for using a so-called electronic switch has been provided in the prior art. Within the electronic switch, a press sensor may be provided, by which a pressing operation by a user's fingertip may be detected. Alternatively a touch sensor may be provided internally in the switch wherein contact by the user's fingertip with the switch is electromagnetically detected, and in this manner there is no risk of foreign obstacles such as dust entering into the electronic switch from the outside because it is generally covered with a cover. When such an electronic switch is used as the start switch, it is necessary to take a countermeasure to prevent malfunction caused by, for example, an unintended on-operation of the start switch inadvertently by the user.

The following Patent Documents disclose techniques for accurately controlling a starting ON state of an electric power tool. Japanese Patent No. 4678199 discloses a technique for preventing the electric power tool from being stolen, such that an on-operation thereof is prohibited unless the user holds the electric power tool by transmitting and receiving information containing the right to use the electric power tool, between the electric power tool and an authentication device that the user puts on. Japanese Laid-Open Patent Publication No. 2013-188803 discloses a technique for adding an authentication feature at low cost with regard to an authentication device on a side of the electric power tool.

With regard to the start switch of the electric power tool, however, it is not only necessary to suppress theft of the electric power tool by prohibiting starting of the electric power tool while the user is not present, but it is also necessary to prevent the on-operation of the tool in an accidental or inadvertent situation by the user even if the electric power tool is not stolen. The present invention is made from this point of view and an object thereof is to allow the on-operation of the electronic switch specifically only under an intended, non-inadvertent situation for the user, where the electronic switch is used as the start switch.

SUMMARY

The above-described problem is solved by the following embodiments of the present disclosure. A first aspect of the disclosure relates to a starting system of an electric power tool including the electric power tool and a wearable device that a user puts on. In the first aspect, the electric power tool includes an electronic switch for starting the electric power tool. Only when the electric power tool is held in a state where it is capable of receiving information from the wearable device that the user puts on, the electric power tool can then transition to a start-standby state where electric functions of the electric power tool can be utilized. In the first aspect, the electric power tool is configured to start by utilizing the electronic switch only in the start-standby state.

According to the first aspect of the present disclosure, the electric power tool can transition to the start-standby state only when information from the wearable device the user puts on is receivable. Only when in the start standby state, the electric power tool will start by the on-operation of the electronic switch. Because of this configuration, for example, in an inadvertent situation involving the user, in a state where the wearable device and the electric power tool are not disposed relative to each other within a certain predetermined distance such the electric power tool is capable of receiving the information from the wearable device, or in a state where an operation of the wearable device for transmitting information is not performed, transmission/reception of information between the electric power tool and the wearable device will not be performed. This in turn prevents the electric power tool from starting. In the case where the electric power tool does not transition to the start-standby state, the electric power tool will not start even if the electronic switch is operated.

A second aspect relates to the starting system according to the present disclosure, wherein the electric power tool is configured to be released from an electrically locked state to transition to the start-standby state by at least one operation with respect to the wearable device that the user puts on.

According to the second aspect of the present disclosure, at a time when at least one said operation is performed by the user, information will be transmitted from the wearable device that the user puts on to the electric power tool. Through this configuration involving only sporadic transmission by the wearable device, power consumption of the wearable device can be suppressed, in comparison with the case where information is constantly being transmitted at all times. According to the second aspect, at least one operation with respect to the wearable device corresponds to an intended, non-inadvertent operation by the user. Under said intended operation by the user, information will be transmitted to the electric power tool to cause the tool to be released from the electrically locked state. In contrast, in an inadvertent situation involving the user, the electric power tool will be held in an electrically locked state. In this electrically locked state, the electric power tool will not start even if the start switch is turned on.

A third aspect relates to the starting system according to the present disclosure, wherein the wearable device includes a tool state informing means for informing the user of the state of the electric power tool.

According to the third aspect, the user can confirm the state of the electric power tool by viewing the tool state informing means. In particular, the user can confirm a load state of the electric motor, a start time thereof, the residual level of charge of the battery pack, or a setting status of operation modes etc. Importantly, tool status such as the residual level of charge of the battery pack or the use history of the electric power tool can be utilized regardless of whether the electric power tool is in the starting state or in the non-starting state.

A fourth aspect relates to the starting system according to the present disclosure, wherein the tool state informing means is configured to be capable of informing the user of the state of the electric power tool regardless of whether the electric power tool is in a starting state or in a non-starting state.

According to the fourth aspect, the user can confirm the state of the electric power tool by viewing the tool state informing means even if the electric power tool is not started.

A fifth aspect relates to the starting system according to the present disclosure, wherein the electric power tool houses an electric motor as a drive source and is provided with a rechargeable battery pack as a power source thereof, and at least one of a load state of the electric motor, a start time thereof, or a residual level of charge of the battery pack is outputted by the tool state informing means, which can inform the user accordingly.

According to the fifth aspect, the user can confirm the load state of the electric motor, the start time thereof, and the residual level of charge of the battery pack by viewing the tool state informing means of the wearable device.

A sixth aspect relates to the starting system according to the present disclosure, wherein the tool state informing means is provided with a display portion for visually displaying the tool information.

According to the sixth aspect, the user can visually confirm the state of the electric power tool by viewing the display portion of the tool state informing means.

A seventh aspect relates to the starting system according to the present disclosure, wherein the wearable device that the user puts on is a wristband, a glove, or a goggle.

According to the seventh aspect, a wristband that the user wraps around the wrist, a glove (working glove) that the user puts on over their hand, or a goggle (glasses) which the user wears over their eyes can be used as the wearable device that the user puts on. The user can control the starting of the electric power tool with one of or a plurality of said wearable devices put on.

An eighth aspect relates to the starting system according to the present disclosure, wherein the electric power tool is provided with pressure sensor switches that are disposed at least at two locations thereof, comprising the electronic switch. In the eighth aspect, the electric power tool is configured to start when at least the two pressure sensor switches are operated in a simultaneous manner.

According to the eighth aspect, unless the two pressure sensor switches are operated in a simultaneous manner, the electric power tool will not start and thus an erroneous start or a malfunction thereof occurring in an inadvertent situation by the user may be prevented. By providing the pressure sensor switches as the electronic switch, the switch operation can be easily performed and also consecutive operation can be performed in comparison to a mechanical switch operated by a slide operation or a tilting operation. After the electric power tool has initially been started, it can be configured to be held in the starting state if one pressure sensor switch is turned on.

DETAILED DESCRIPTION OF EMBODIMENTS

Figure 1:
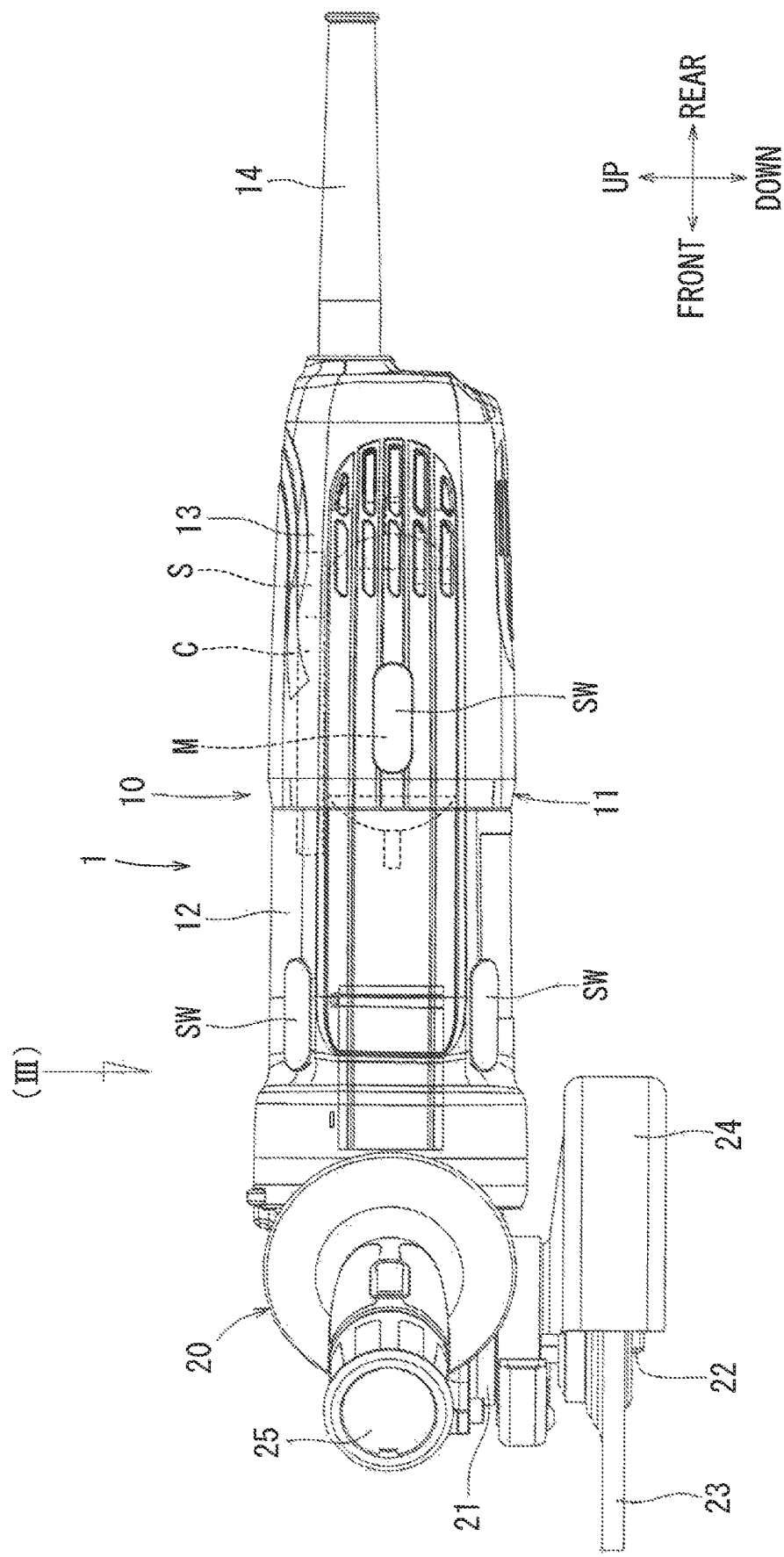
FIG. 1 is a left-side view of an electric power tool according to an embodiment.
Figure 2:
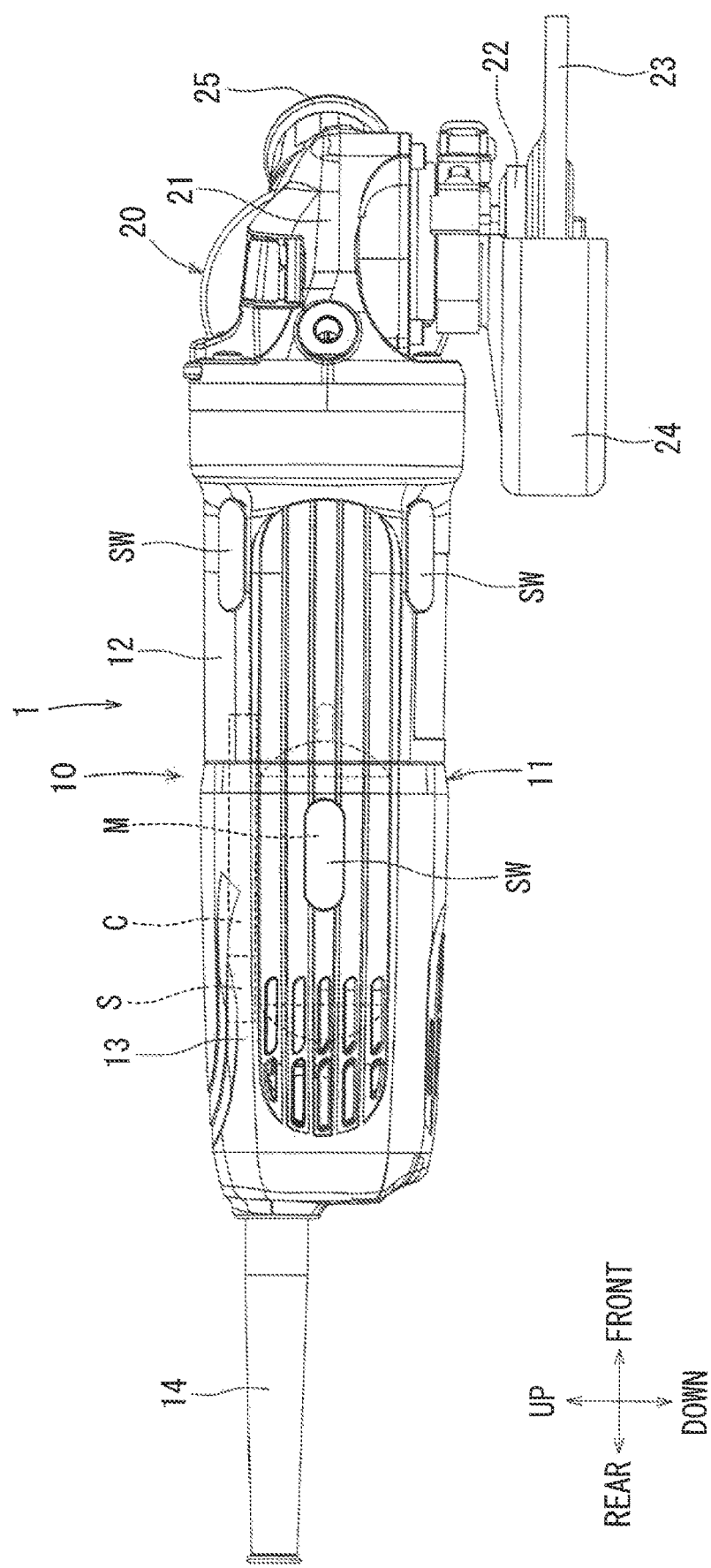
FIG. 2 is a right-side view of the electric power tool according to the embodiment.
Figure 3:
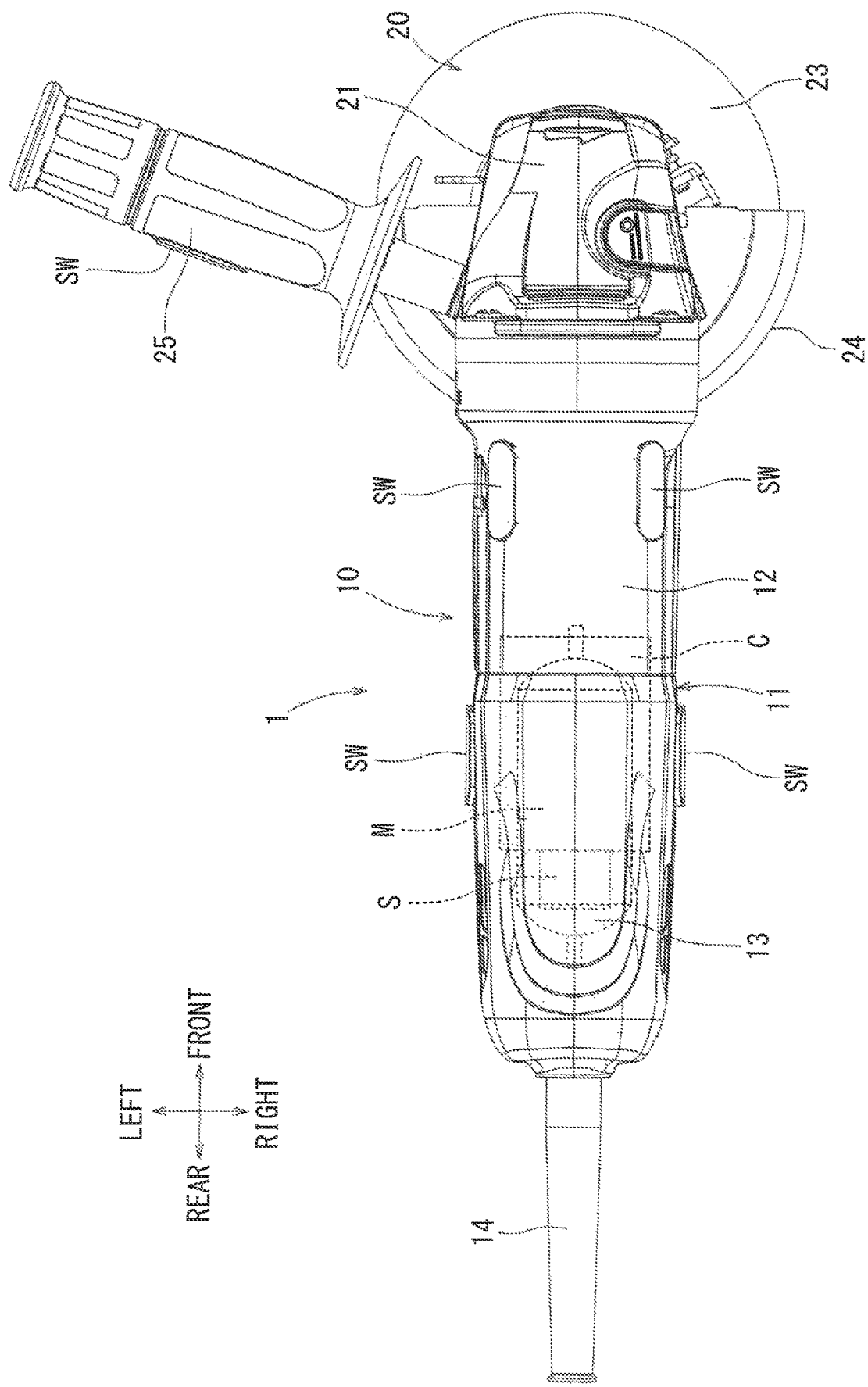
FIG. 3 is a plan view of the electric power tool viewed in a direction indicated by an arrow (III) in FIG. 1.

Next, an embodiment of the present disclosure, along with sub-embodiments of the wearable device, will be explained with reference to FIGS. 1 to 9. FIGS. 1 to 3 show an electric power tool 1 of the present embodiment. In the present embodiment, a disc grinder is exemplified as the electric power tool 1. The electric power tool 1 is provided with a tool main body 10, which houses an electric motor M as a driving source. The motor is housed in a tubular shaped main body case 11. The electric power tool 1 also includes a gear head 20 that is connected to a front portion of the tool main body 10. In the present embodiment, the main body case 11 is configured in subparts such that a rear case 13 forming the rear side of the main body case 11 is connected to a front case 12, which forms the front side of the main body case 11. A power cord 14 used for supplying power to the electric power tool 1 is pulled out from a rear portion of the rear case 13. The electric motor M starts with AC power as a power source, where the AC power source, such as mains power, is connected to and supplies power through the power cord 14, to electric power tool 1.

A controller C, which includes a power supply circuit and a motor control circuit for controlling the starting/stopping and rotation speed of the electric motor M, is housed in the main body case 11. Furthermore, in addition to the controller C, a transmission/reception part S of the tool 1 is housed in the main body case 11, for transmitting and receiving radio signals between the main body case 11 and a wearable device wearable by the user that is discussed infra. Control signals are transmitted and received between the transmission/reception part S and the controller C.

Rotation output of the electric motor M is outputted to a spindle 22 via a gear train (an engagement with a bevel gear) housed within the gear head 20. The spindle 22 is supported by a gear head case 21. Additionally, the spindle 22 is rotatably supported about an axis which lies to the front of and perpendicular to the output shaft of the electric motor M.

The spindle 22 protrudes downwards from the lowest portion of the gear head case 21. A circular whetstone 23 is attached to the protruding portion. Substantially half of the circumference, around the rear half of the whetstone 23 is covered with a whetstone cover 24 (see FIG. 1). Thus, the scattering of dust etc. toward a side of the user, at the rear of the whetstone, can be prevented by this whetstone cover 24. A front grip 25 is provided on the left side of the gear head case 21.

The user can use the electric power tool 1 while holding the electric power tool 1 with both hands. Namely, they may hold main body case 11 with their right hand and the front grip 25 with their left hand. Four start switches SW in total are arranged around the circumferential periphery of the front case 12. The four start switches SW are arranged one each on an upper portion and a lower portion, on both the left side and the right side of the front case 12, respectively. In addition to the described four start switches SW, two more start switches SW in total are arranged around the circumferential periphery of the rear case 13, at a vertically central portion on the left and right sides of the rear case 13. Furthermore, one additional start switch SW is arranged on the left surface of the front grip 25, perpendicular to the main body case 11. For each of the seven start switches SW in total, an electronic switch (a pressure sensor switch) is used instead of a conventional mechanical switch such as a slide-operation type switch or a tilt-operation type switch. When each of the start switches SW is pressed by a user's fingertip, its pressure is detected and an on-signal is output to the controller C.

A start control paradigm of the electric power tool 1 is configured such that the electric motor M starts only when any one of the four start switches SW around the front case 12, as well as any one of the two start switches SW on the side of the rear case 13, are simultaneously turned on. Alternatively, the electric motor M starts only when the start switch SW on the front grip 25 as well as any one of the four start switches SW on the side of the front case 12, or any one of the two start switches SW on the side of the rear case 13, are turned on in a simultaneous manner. The electric motor M will not start when only one of the seven switches SW is turned on. Furthermore, the electric motor M will not start when two start switches SW only on around the front case 12 are simultaneously turned on, or when two start switches SW only around the rear case 13 are simultaneously turned on. The electric motor M will start only when two switches SW separately disposed in the front-to-rear direction are simultaneously turned on, where said switches are selected among one start switch SW out of those present around the front case 12, one start switch SW out of those present around the rear case 13, and the one start switch SW on the left side of the front grip 25.

In most cases, the user will turn on one of the start switches SW on the side of the front case 12 with a fingertip of one hand and one of the start switches SW on the side of the rear case 13 with a fingertip of the other hand in a simultaneous manner (e.g. using a fingertip of the hand holding the front grip to turn on the start switch SW on the side of the front case 12, and using a fingertip of the hand holding the main body 11 to turn on the start switch SW on the side of the rear case 13). In this way, the electric motor M will start only when the user turns on two start switches SW by using both hands, thereby preventing the inadvertent start of the electric motor M unintentionally by the user. The user can use the electric power tool 1 while holding the front case 12 with one hand and the rear case 13 with the other hand. While the electric motor M is running after two start switches SW are turned on in a simultaneous manner, if the one of the turned-on start switches SW is released from on-operation (if the user releases their fingertip from pressing the one of the start switches SW), the electric motor M is then held in the starting state and does not stop running as long as the other start switch SW is turned on. When both of the turned-on two start switches SW are released from on-operation, the electric motor M will then stop, and on-operation ceases. With regard to a stop operation of the electric power tool 1, the electric motor M may also be configured to stop by performing a push operation of the one of the turned-on start switches SW twice (a double-tap operation) while the other of the start switches SW is held in the on-operation state (where the electric motor M is operational). Because of this configuration, the user can stop the electric motor M while firmly holding the electric power tool 1.

When any one of the remaining five start switches SW is turned on after the electric motor M starts by turning on two start switches SW, the starting state of the electric motor M will be locked to cause the electric power tool 1 to be held in a continuous running state (a so-called locked state). After the electric power tool 1 is once held in the continuous running state, the continuous running state of the electric motor M will be held even if all of the three start switches SW are released from the on-operation (even if the user detaches the fingertips from all of the three start switches SW). Because of this configuration, for example, the user can easily perform a polishing work to a portion of a working surface continuously for a long time while holding the rear side of the tool main body 10 with one hand, without needing to hold any of the SW buttons. In this continuous running state, when any one of the seven start switches SW is pushed (an off-operation), the running continuation state will be released to cause the electric motor M to stop.

Furthermore, during the continuous running state (locked-on state) of the electric power tool 1, at a time when the wearable device W worn by the user and the electric power tool 1, in relation to each other are disposed too far away to receive information, then the state will change to an electrically locked state that is mentioned infra, so as to cause the continuous running state to be cancelled. Because of this configuration, the starting system also possesses a tool theft suppressing effect and safety is also enhanced since the starting of the tool as well as the continuous running state thereof under an unintended situation for the user can be eliminated.

As described above, the starting state is configured to be changed to the continuous running state when three start switches SE are pressed. Alternatively, the starting state may be configured to transition to the continuous running state when, for example, any one of the remaining start switches SW is double-tapped after the electric motor M starts by turning on two start switches SW.

On-operation of the seven start switches SW in total will become effective only in a start-standby state that is previously set by the controller C. The start-standby state is continuously obtained as long as a use permission signal from the wearable device W the user puts on is received by the transmission/reception portion S. In a state where the use permission signal from the wearable device W is not received by the transmission/reception portion S, the controller C will set the electric power tool 1 in an electrically locked state and any push operation with regard to the start switches SW will not be effective in starting the electric power tool 1.

The use permission signal will be received by the transmission/reception portion S only when the user who puts on the wearable device W approaches the electric power tool 1 within a predetermined distance. As long as the user is within the predetermined distance and is wearing the device, then the use permission signal will be transmitted from the wearable device W at all times in this state. Alternatively, the use permission signal may be transmitted when at least one operation is performed with respect to the wearable device W. In the former case, when the user approaches the electric power tool 1 within the predetermined distance, the use permission signal will be received by the transmission/reception portion S. In the latter alternative case, when the user approaches the electric power tool 1 within the predetermined distance independently, at least one other operation is performed with respect to the wearable device W, then the use permission signal will be transmitted from the wearable device W and received by the transmission/reception portion S of the electric power tool 1.

Figure 4:
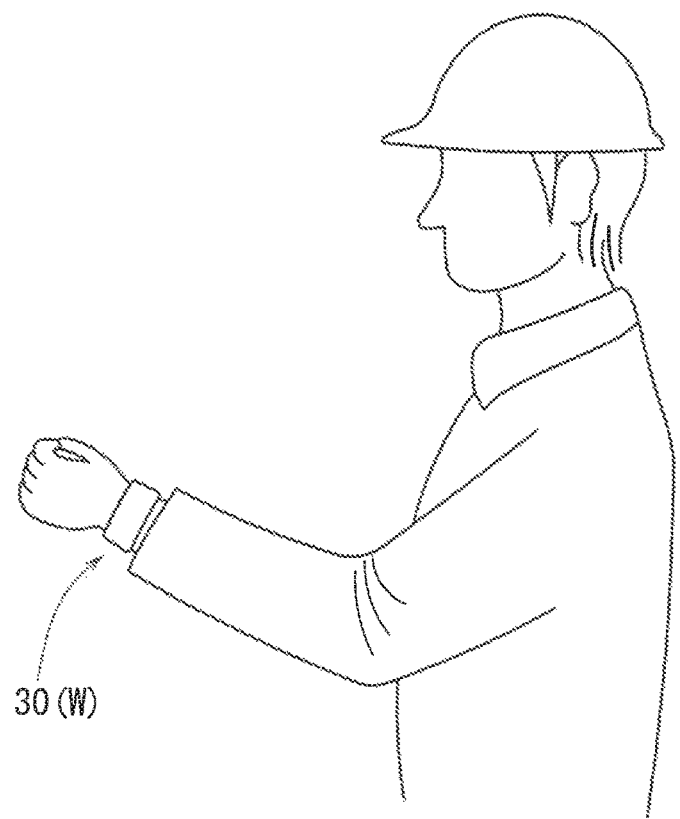
FIG. 4 is a figure showing a user who wears a wearable device according to a first embodiment.
Figure 5:
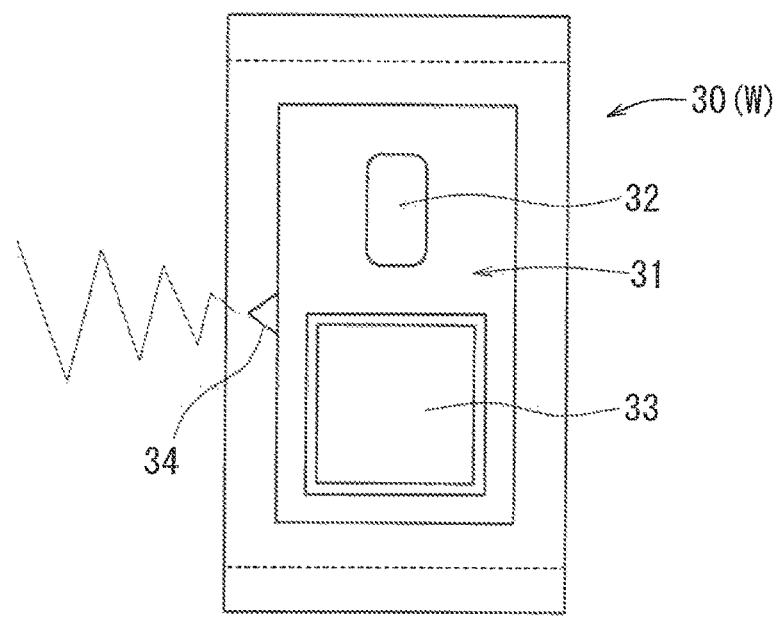
FIG. 5 is a wrist band as the wearable device according to the first embodiment.

Various embodiments of the wearable device W that transmits the use permission signal are present. These various embodiments of the wearable device W will be explained below. FIGS. 4 and 5 shows a wristband 30 that the user wraps around their wrist, as a first embodiment of the wearable device W. The wristband 30 may be made of a fabric material appropriate for wrapping around the wrist, having a proper degree of flexibility and elasticity suitable for easy attachment to and detachment from the wrist. An operation panel 31 is provided on an outer surface side of the wristband 30, where a magnified view of said panel 31 is shown in FIG. 5. The operation panel 31 is provided with a transmitter switch 32 for transmitting the use permission signal, a display portion (tool state reporting means) 33 for mainly reporting an operation state of the electric power tool 1, and an antenna 34. Furthermore, though not shown in the figures, a button battery cell is embedded within the wristband 30 as a power source in a replaceable manner.

When the user who puts on the wristband 30 around the wrist as shown in FIG. 4 operates the transmitter switch 32 on the operation panel 31 to start transmitting the use permission signal, said signal will be transmitted from the antenna 34. When the user is positioned within the aforementioned predetermined distance (use permission signal receiving distance) from the electric power tool 1, and the permission signal is being transmitted by the transmitter switch 32 from the wearable device W, the permission signal is received by the transmission/reception portion S of the electric power tool 1. When the use permission signal in turn is received by the transmission/reception portion S, the user permission signal is then transmitted to the controller C, thereby changing the state of electric power tool 1 from the electrically locked state to the start standby state. In the case of the wristband 30, the predetermined distance for receiving the use permission signal may be set to, for example, approximately 30 cm.

When the user turns on two start switches SW in the manner discussed above, when the electric power tool 1 is in the start standby state, the electric motor M will then start, and the electric power tool 1 can be used. Furthermore, the electric power tool 1 can be made to operate in the continuous running state by operating three start switches SW in a simultaneous manner as described above. In said continuous running state, if the user places the electric power tool 1 on a work bench and leaves the place beyond the use permission signal receiving distance, or if the user accidentally drops the electric power tool 1 on the floor, the use permission signal that is transmitted from the wristband 30 will cease to be received by the transmission/reception portion S once the predetermined distance is exceeded. Then, when the use permission signal is not received, the controller C will set the electric power tool 1 to be released from the running continuation state and power supply to the electric motor M will promptly be cut off at that point in time to cause the electric motor M to stop.

The display portion 33 on the wristband 30 will display an operation state of the electric power tool 1 such as a load state, an output rotation speed of the electric motor M, and a start time, as well a residual quantity of remaining battery power in the case where the electric power tool 1 is operated by a battery back. This information will be consolidated by the controller C and will be transmitted from the transmission/reception portion S. Information transmitted from the transmission/reception portion S will be displayed on the display portion S as the tool state reporting means. As a result, the user can visually ascertain and be informed of the operation state of the electric power tool 1 by viewing the display portion 33.

According to the structural configuration of the wristband 30, the electric power tool 1 can be used only when the user who puts on the wrist band 30 actually holds the electric power tool 1. In this respect, use of the electric power tool 1 in an unintentional situation by the user can be avoided. Furthermore, even when the user who puts on the wristband 30 holds the electric power tool 1, unless the user then operates the transmitter switch 32 to transmit the user permission signal, the electric power tool 1 will still not be change its state to the start standby state, and the on-operation of the start switch SW will not become effective, thereby inactivating the electric motor M until the user specifically takes action to turn on the transmitter switch 32.

Furthermore, in the continuous running state of the electric power tool 1, when the wristband 30 and the electric power tool 1 exceed the predetermined distance, and are too far from each other for the electric power tool 1 to therefore receive the use permission signal according to this set distance (see, e.g. 30 cm as described above), the electric power tool 1 will be changed to the electrically locked state at that time, and the continuous running state will be halted with immediate effect. Because of this configuration, the starting system possesses an enhanced physical safety, as well as a tool theft suppressing effect. In addition, the starting of the tool as well as the continuous running state thereof in an unintentional situation by the user can be eliminated. Furthermore, when the user accidentally drops the electric power tool 1 on the floor, by setting the predetermined distance accordingly, the running state can be immediately halted and automatically released.

Though not shown in the figures, a wrist watch can also be used as the wearable device W, by providing the exemplified operation panel 31 and the transmission switch 32 etc. of the wristband 30 as part of the wrist watch.

Figure 6:
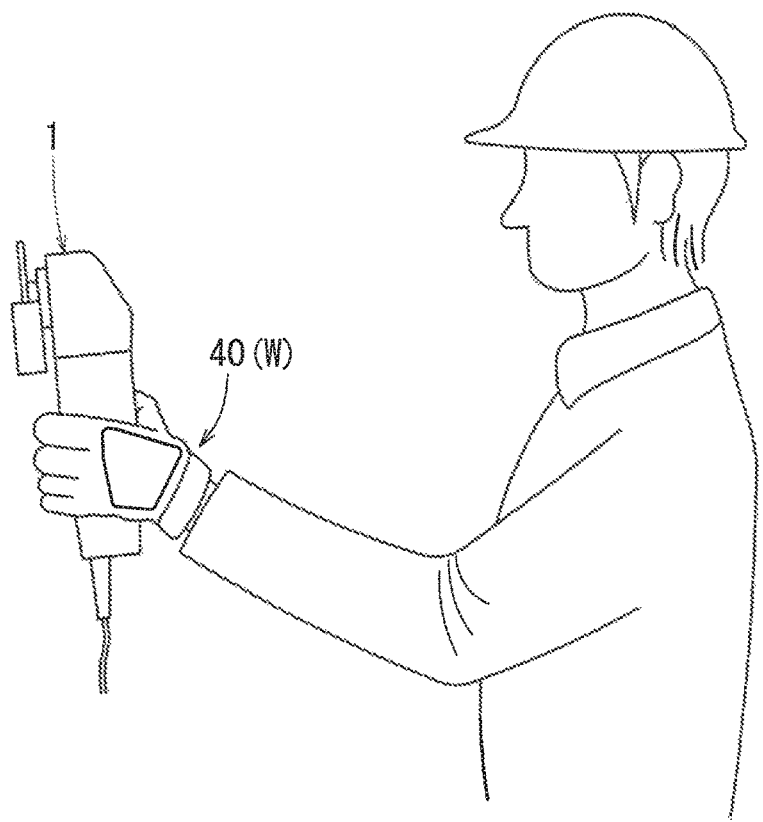
FIG. 6 is a figure showing a user who wears a wearable device according to a second embodiment.
Figure 7:
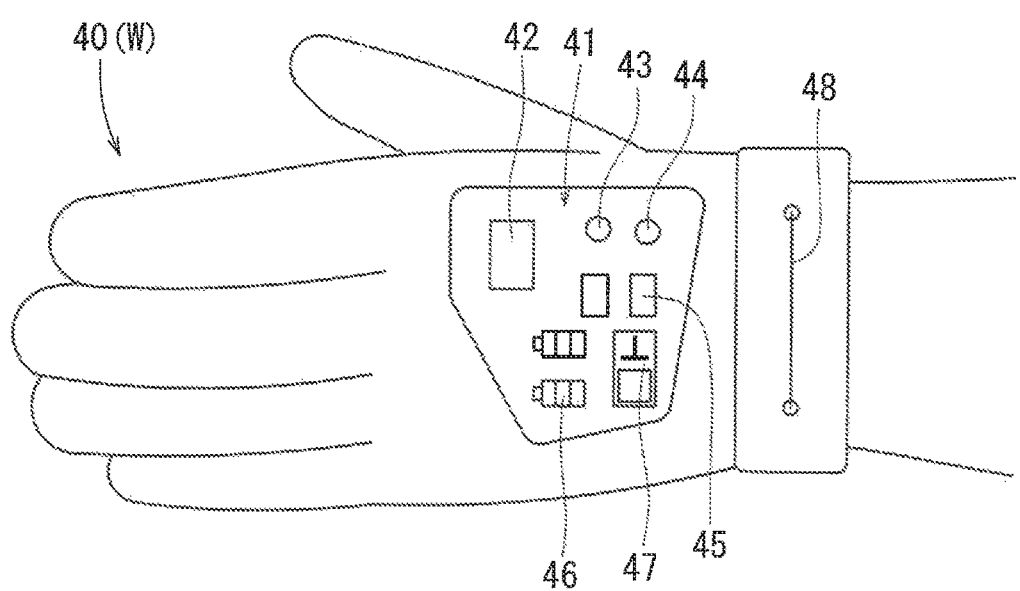
FIG. 7 is a glove as the wearable device according to the second embodiment.

FIGS. 6 and 7 show a glove (a working glove) 40 that the user puts on as a second embodiment of the wearable device W. An operation panel 41 is provided on the glove 40 on the back side of the hand. The operation panel 41 is provided with a transmission switch 42 for transmitting the use permission signal, a load state indication lamp for informing the user whether an overload state is present or not by its lighting, a starting state indication lamp 44 for informing the user whether a start-standby state has been obtained or not by its lighting, a mode indication lamp 45 for informing the user about which operation mode of the electric power tool 1 is currently in as depicted by its lighting color, battery residual indication portions for informing the user about the residual amount of battery left in a rechargeable battery pack where said battery pack is used as a power source for the electric power tool 1, as well as for informing the user of the residual amount of battery left in a battery (for example, a button battery) serving as a power source for the glove 40, and a suitability indication lamp 47 for informing the user of the suitability of operation of the glove 40 with respect to the electric power tool 1 by its lighting. An antenna 48 is provided on the outer wrist portion of the glove 40 adjacent to the operation panel 41.

When the user who puts on the glove 40 operates the transmission switch 42 while holding the electric power tool 1, the use permission signal will be transmitted through the antenna 48. The transmitted use permission signal will be received by the transmission/reception portion S. Even in the case of the glove 40, it is desirable to set the use permission signal receiving distance to approximately 30 cm. When the user operates the transmission switch 42 at a position apart from the electric power tool 1 exceeding the use permission signal receiving distance, the use permission signal transmitted from the antenna 48 will then not reach the transmission/reception S. In the electric power tool 1 that can receive the user permission signal in the transmission/reception S thereof, upon successful reception of said signal the tool can transition from the electrically locked state to the start standby state. When the user turns on two start switches SW in the standby state in the manner described above, the electric motor M will start, and further when the user further turns on the third start switch SW in the starting state in the manner described above, the starting state will then be locked to cause the electric power tool 1 to be held in the continuous running state.

If the user leaves while the electric power tool 1 is held in the continuous running state, the use permission signal will not be received by the transmission/reception portion S once the predetermined set distance (e.g. 30 cm) is exceeded, and at that moment the state of the electric power tool 1 changes to the electrically locked state such that the running continuation state is immediately cancelled. Because of this configuration, in the same way as the wristband 30 of the first embodiment, the starting system of the electric power tool 1 that includes the glove 40 serving as the wearable device possesses not only a safety enhancing but also a tool theft suppressing effect and also the starting of the tool as well as the continuous running state thereof in an unintentional situation by the user can be eliminated. Furthermore, with the appropriate predetermined distance set (e.g. 30 cm), when the user accidentally drops the electric power tool 1 on the floor, the predetermined distance is exceeded mid-drop, and the running continuation state can be automatically released before the electric power tool 1 hits the floor.

Figure 8:
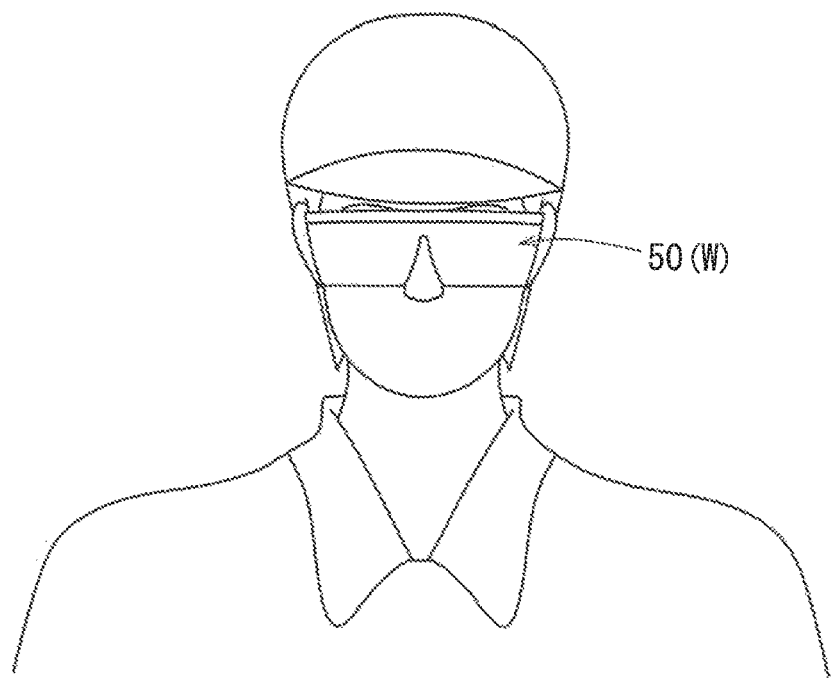
FIG. 8 is a figure showing a user who wears a wearable device according to a third embodiment.
Figure 9:
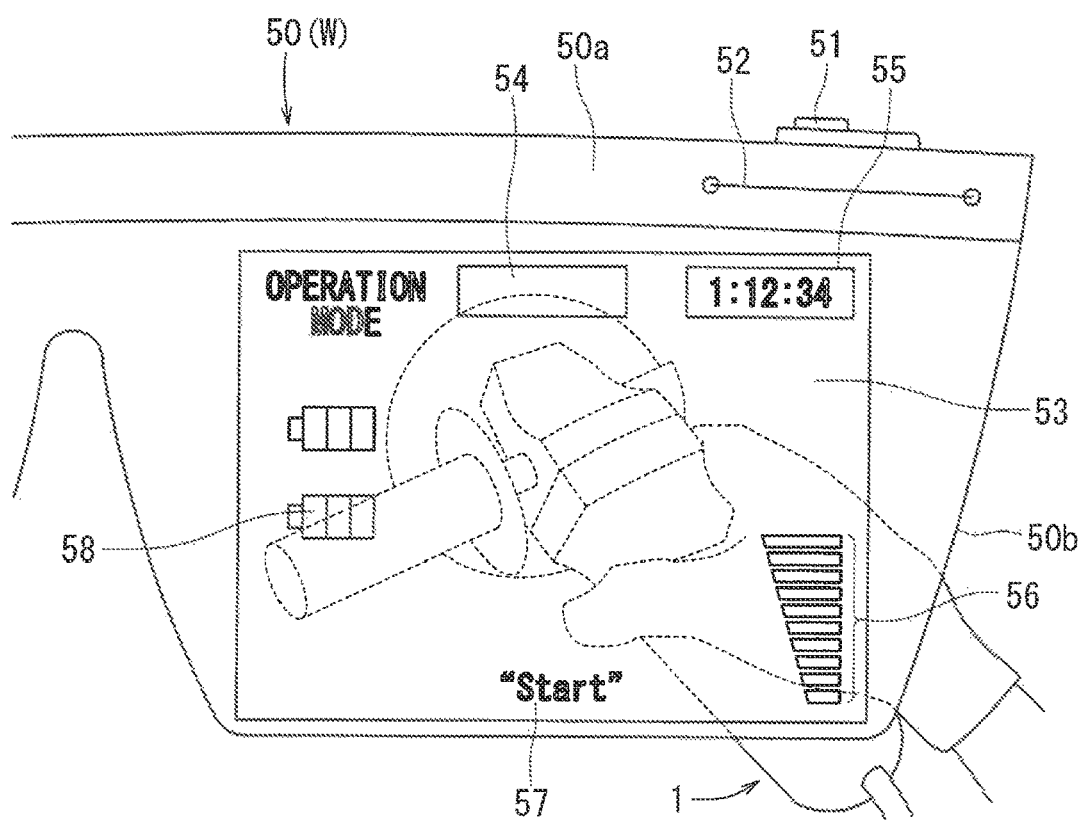
FIG. 9 is a goggle as the wearable device according to the third embodiment.

FIGS. 8 and 9 show safety goggles 50 as the third embodiment of the wearable device W. A frame 50a of the goggle 50 is provided with a transmission switch 51 and an antenna 52. Furthermore, though not shown in the figures, a button battery is embedded with the frame 50a as the power source of the wearable device W, such that it is replaceable. FIG. 9 shows an operational state of the goggles wherein the electric power tool 1 is viewed from one of lenses 50b of the goggle 50. The lens 50b is provided with a transmitter type liquid crystal display 53. The transmitter type liquid crystal display 53 is provided with a mode display portion 54 for displaying an operation mode of the electric power tool 1 by a string of characters, a time display portion 55 for displaying a working time (a start time), a load state display portion 56 for displaying the loading progress (e.g. by a progressive bar chart as shown in FIG. 9) of the electric motor M, a starting state display portion 57 for showing whether the electric power tool 1 is or is not in the start standby state where the electric power tool 1 can start, and battery residual indication portions 58 for visually informing the user of a residual amount of battery left in a rechargeable battery pack in the case where said pack is used as a power source of the electric power tool 1 as well as for visually informing the user of a residual amount of battery left in a battery (e.g. a button battery as described above) serving as a power source for the liquid crystal display 53.

When the goggles 50 are used, it is desirable to set the use permission signal receiving distance to a longer distance than the previous embodiments of the wearable devices W (for example, about 1 m to 2 m), compared to the 30 cm used for the wristband 30 and the glove 40 is used. When the user who puts on the goggles 50 approaches the electric power tool 1 within the use permission signal receiving distance (1 m to 2 m) and proceeds to operate the transmission switch 51, various information about the electric power tool 1 will be visually displayed on the liquid crystal display 53. The user can confirm an operation mode currently set in the electric power tool 1 by viewing the mode display portion 54 displayed on the liquid crystal display 53. The user can confirm previous working hours by viewing the time display portion 55, and also the user can confirm a residual amount of battery left in the battery pack. Furthermore, while the electric power tool 1 is used, the loading progress of the electric motor M can be confirmed by viewing the load state display portion 56, and also the user can confirm whether the electric power tool 1 is or is not in the starting state by viewing the starting state display portion 57.

Furthermore, when the user operates the transmission switch 51 after approaching the electric power tool 1 within the user permission signal receiving distance, the use permission signal transmitted from the antenna 52 is then received by the transmission/reception portion S of the electric power tool 1. When the use permission signal is received by the transmission/reception portion S, the state of the electric power tool 1 changes from the electrically locked state to the start standby state. When two start switches SW are turned on in the start standby state in the manner described above, the electric motor M will start and the electric power tool 1 can be used. Furthermore, when the third start switch SW is turned on in the starting state in the manner described above, the starting state may be locked, causing the electric power tool 1 to enter the continuous running state.

When the start switches SW are released from the starting state, the electric motor M will stop. Furthermore, when the user stops handling the electric power tool 1 and leaves the location where the electric power tool 1 is placed, while the tool 1 is held in the running continuation state, the use permission signal will then not be received by the transmission/reception portion S once the predetermined distance between the device W worn by the user and the power tool 1 exceeds the predetermined distance, and thus the state of the electric power tool 1 will change from the start-standby state to the electrically locked state, and at the moment of this transition the continuous running state of the tool will be immediately cancelled, causing the electric motor M to stop. In this way, operating the electric power tool 1 is prohibited in an unintentional situation by the user who puts on the wearable device of the third embodiment (goggle 50), and thus the starting system according to this embodiment possesses not only a safety enhancing but also a tool theft suppressing effect in the electric power tool 1. Furthermore, with the appropriate predetermined distance set (e.g. 1-2 m), when the user accidentally drops the electric power tool 1 on the floor, the predetermined distance is exceeded mid-drop, and the running continuation state can be automatically released before the tool hits the floor.

Further modification may also be made to the above-described embodiments of the tool and the wearable device W. In the first to third embodiments of the wearable device W, the wearable device W is configured such that the use permission signal is transmitted only for the duration of when the user operates the transmitter switch 32, 42, or 51 thereof, respectively. However, the wearable device W may be configured such that the use permission signal is transmitted at all times when the user operates the transmission switch 32, 42, 51. For example, a Bluetooth (a registered trademark) communication or infrared communication device and associated protocol can be used with respect to the use permission signal.

Furthermore, as an additional alternative to the configuration where the use permission signal is transmitted by user operation, the wearable device W may be configured such that the use transmission signal is transmitted at fixed times or at predetermined time intervals. Furthermore, the wearable device W may be configured such that the use permission signal is transmitted in a time range such as, for example, from am 8:00 to pm 5:00. In this case, the transmission switch 32, 42, or 51, respectively can be omitted.

In the above-described embodiments, when the user operates the transmission switch 32, 42, 51, the wearable device W is configured such that various information about the electric power tool 1 is shown on the operation panel 31, 41, or the liquid crystal display 53 thereof. Alternately, at a time when the user approaches the electric power tool 1 within the predetermined use permission signal receiving distance, the wearable device W may be configured to automatically display various information.

Furthermore, besides visual means such as the display panel or LED indications as the tool status informing means, as a further alternative, an audible means such as an electronic sound, music, or voices can also be used by the embodiments of the wearable device W.

Furthermore, the electric power tool 1 is configured to be provided with seven start switches SW in total, but the number of the start switches SW can be determined arbitrarily, and may be increased or decreased as needed. For example, the electric power tool 1 may be configured to have one start switch SW and when the start switch SW is pushed twice, it may start and when the start switch SW is pushed once in the starting state, the electric motor M may stop. In this one start switch SW case, the electric power tool 1 may be configured to transition to the continuous running state when the start switch SW is pushed for a long duration, for example, 2 seconds in the starting state.

Furthermore, besides the pressure sensor type switch, an electrostatic type switch can also be used as the start switch SW. Furthermore, a forcible stop switch may be provided apart from a plurality of start switches SW. As an alternative to the case where the use permission signal is received by the wearable device W or any starting state of the electric power tool 1, the power supply to the electric motor M may be cut by operating a forcible-stop or kill switch, which causes all of the operation of the electric power tool 1 to cease in an instant and forcible manner.

Furthermore, as the embodiments of the wearable device W, the wristband 30, the glove 40, the goggle 50 are exemplified, but other wearable devices such as a hat, working clothes, a belt, a working bag, or like accessories can also be applied to said exemplified configurations. Furthermore, the starting control configuration of the electric power tool 1 can also be performed by a plurality of the wearable devices W in combination.

Furthermore, the disc grinder is exemplified as the electric power tool 1, but the starting system can also be widely applied to other electric tools such as a screw fastener or a cutting device etc.

What is claimed is:

1. A starting system of an electric power tool including the electric power tool and a wearable device that a user puts on, wherein:
    the electric power tool includes an electronic switch for starting the electric power tool;
    only while the electric power tool is held in a state capable of receiving information from the wearable device that the user puts on, the electric power tool may then enter a start-standby state, where electric functions of the electric power tool can be utilized; and
    the electric power tool is configured to start by an operation of the electronic switch only when the tool is in the start-standby state;
    the electric power tool is provided with pressure sensor switches that are disposed at east at two locations thereof as the electronic switch; and
    the electric power tool is configured to start when at least the two pressure sensor switches are operated in a simultaneous manner.

2. The starting system according to claim 1, wherein the state of the electric power tool is configured to be released from an electrically locked state and transition to the start standby state only when at least one operation with respect to the wearable device that the user puts on is performed by the user.

3. The starting system according to claim 1, wherein the wearable device includes a tool state informing means for informing the user of a state of the electric power tool.

4. The starting system according to claim 3, wherein the tool state informing means is configured to be capable of informing the user of a state of the electric power tool regardless of whether the electric power tool is in a starting state or in a non-starting state.

5. The starting system according to claim 1, wherein:
    the electric power tool houses an electric motor as a drive source and is provided with a rechargeable battery pack as a power source thereof; and
    at least one of a load state of the electric motor, a start time thereof, or a residual level of charge of the battery pack is outputted by a tool state informing means to the user, to inform the user.

6. The starting system according to claim 3, wherein the tool state informing means is provided with a display portion for visually displaying tool information to the user.

7. The starting system according to claim 1, wherein the wearable device that the user puts on is a wristband, a glove, or safety goggles.

8. An electrical power tool and an associated wearable device that a user puts on or wears on their body, wherein:
    the wearable device includes a transmitter switch which must be manipulated to transmit a use permission signal,
    the electric power tool includes an electronic switch for starting the electric power tool;
    where the electric power tool remains electrically locked, and enters a start-standby state only when it is able to receive the use permission signal from the wearable device, wherein electric functions of the electric power tool can be utilized only in the start-standby state; and
    the electric power tool is configured to start by an operation of the electronic switch only when the electric power tool is in the start-standby state, the electric power tool is provided with pressure sensor switches that are disposed at least at two locations thereof as the electronic switch; and the electric power tool is configured to start when at least the two pressure sensor switches are operated in a simultaneous manner.

9. The electrical power tool of claim 8, wherein the use permission signal is only given for the duration of time that the user manipulates the transmitter switch.

10. The electrical power tool of claim 8, wherein the use permission signal is given at all times once the user manipulates the transmitter switch.

11. The electrical power tool of claim 8, wherein the use permission signal is given at predetermined time intervals once the user manipulates the transmitter switch.

12. An electrical power tool and an associated wearable device that a user puts on or wears on their body, wherein:

the wearable device includes a transmitter switch which must be manipulated to transmit a use permission signal, the electric power tool includes a plurality of electronic switches for starting the electric power tool, wherein starting the electric power tool involves starting the operation of a motor, wherein all operation of the electric power tool ceases once any of the electronic switches are released, unless the electric power tool is in a continuous running state;

wherein the electric power tool remains electrically locked, and enters a start-standby state only when it is able to receive the use permission signal from the wearable device, wherein electric functions of the electric power tool can be utilized only in the start-standby state; and the electric power tool is configured to start by an operation of at least four start switches of the plurality of electronic switches only when the electric power tool is in the start-standby state; and wherein the at least four start switches include at least two switches that are placed at a front of a main body case of the electrical power tool, and at least two switches that are placed at a rear of the main body case.

13. The electrical power tool of claim 12, wherein the electrical power tool is a disc grinder with a circular whetstone, and the main body case is a tubular shaped main body case.

14. The electrical power tool of claim 13, wherein an additional switch is placed on a front grip at the front and extending from the main body case of the electrical power tool, where the user holds the front grip with one hand and the main body case of the tool with their other hand.

15. The electrical power tool of claim 13, wherein at least one of the start switches at the front of the main body case, as well as one of the start switches at the rear of the main body case, must be simultaneously pressed in order for the electrical power tool to be started.

16. The electrical power tool of claim 15, wherein when at least one of the start switches at the front of the case, as well as one of the start switches at the rear of the case, are simultaneously pressed, and then subsequently one of the remaining start switches is also pressed, then the electrical power tool enters a continuous running state, wherein the electric power tool will continue to run even when the user stops pressing the switches, as long as the use permission signal is received from the wearable device.

* * * * *